(12) United States Patent
Scott

(10) Patent No.: US 12,238,610 B2
(45) Date of Patent: *Feb. 25, 2025

(54) SYSTEMS AND METHODS FOR PROCESSING GEOGRAPHICAL ZONES

(71) Applicant: Geotab Inc., Oakville (CA)

(72) Inventor: Michael Scott, Langley (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,345

(22) Filed: May 3, 2024

(65) Prior Publication Data

US 2024/0292182 A1 Aug. 29, 2024

Related U.S. Application Data

(63) Continuation of application No. 18/390,129, filed on Dec. 20, 2023, now Pat. No. 12,075,307.

(Continued)

(51) Int. Cl.
*H04W 4/21* (2018.01)
*G08G 1/00* (2006.01)
(Continued)

(52) U.S. Cl.
CPC ............ *H04W 4/021* (2013.01); *G08G 1/207* (2013.01); *H04W 4/029* (2018.02)

(58) Field of Classification Search
CPC ........ H04N 7/181; H04N 7/188; H04W 4/021
(Continued)

(56) References Cited

U.S. PATENT DOCUMENTS 7,088,358 B2   8/2006   Aharon et al.
7,353,114 B1 *  4/2008   Rohlf .................... G06F 40/143
                                              702/5

(Continued)

FOREIGN PATENT DOCUMENTS

WO   2023177391 A1   9/2023

OTHER PUBLICATIONS

Extended European Search Report for European Application No. 23217206.4, mailed Jun. 20, 2024, 11 pages.
(Continued)

*Primary Examiner* — Joseph Arevalo
(74) *Attorney, Agent, or Firm* — Lawrence Xin-Tao Yu

(57) ABSTRACT

Systems and methods for processing geographical zones are provided. The method involves operating at least one processor to: define a bounding box surrounding a geographical zone; iteratively partition the bounding box into a plurality of bounding boxes by, starting with the bounding box in the first iteration: determine whether the bounding box contains more than a predetermined maximum number of vertices; divide the bounding box into two additional bounding boxes if the bounding box contains more than the predetermined maximum number of vertices, repeat the steps of determining and dividing the bounding box for the additional bounding boxes in the next iteration until each additional bounding box does not contain more than the predetermined maximum number of vertices; generate a binary tree data structure representing the geographical zone; search the binary tree data structure to determine whether a vehicle is located within one of the bounding boxes.

19 Claims, 11 Drawing Sheets

Related U.S. Application Data

(60) Provisional application No. 63/440,143, filed on Jan. 20, 2023.

(51) Int. Cl.
*H04W 4/021* (2018.01)
*H04W 4/029* (2018.01)

(58) Field of Classification Search
USPC ... 455/456.1, 456.2, 456.3, 456.5, 434, 420, 455/414.1, 457
See application file for complete search history.

(56) References Cited

U.S. PATENT DOCUMENTS

| | | | |
|---|---|---|---|
| 7,746,343 B1* | 6/2010 | Charaniya | G06N 7/01 345/428 |
| 8,180,379 B2 | 5/2012 | Forstall et al. | |
| 9,041,556 B2 | 5/2015 | Tucker et al. | |
| 9,520,062 B2 | 12/2016 | Tucker et al. | |
| 10,140,863 B2 | 11/2018 | Tucker et al. | |
| 10,670,735 B2 | 6/2020 | Tu et al. | |
| 10,748,422 B2 | 8/2020 | Tucker et al. | |
| 11,727,339 B2 | 8/2023 | Davidson et al. | |
| 11,741,760 B1 | 8/2023 | Dubin et al. | |
| 11,861,785 B2 | 1/2024 | McAllister et al. | |
| 11,959,772 B2 | 4/2024 | Robbins et al. | |
| 2001/0013867 A1 | 8/2001 | Watanabe et al. | |
| 2004/0193566 A1 | 9/2004 | Kothuri | |
| 2006/0247845 A1* | 11/2006 | Cera | G08G 1/09 701/117 |
| 2006/0247846 A1* | 11/2006 | Cera | G08G 1/09 701/118 |
| 2008/0016472 A1* | 1/2008 | Rohlf | G06F 16/9537 715/848 |
| 2014/0146047 A1 | 5/2014 | Wu et al. | |
| 2018/0342030 A1* | 11/2018 | Magleby | G06F 17/10 |
| 2019/0045324 A1* | 2/2019 | Eldic | H04W 4/029 |
| 2019/0066328 A1* | 2/2019 | Kwant | G06V 10/752 |
| 2020/0035000 A1* | 1/2020 | Raut | G06T 11/203 |
| 2020/0240805 A1* | 7/2020 | Kanajan | G05D 1/0088 |
| 2020/0264002 A1* | 8/2020 | Gotsman | G06F 16/9537 |
| 2020/0314588 A1 | 10/2020 | Kirwan | |
| 2022/0228887 A1 | 7/2022 | Robbins et al. | |
| 2022/0357453 A1 | 11/2022 | Zhou et al. | |
| 2023/0018053 A1 | 1/2023 | Bhowmick | |
| 2023/0413302 A1 | 12/2023 | Dhanani et al. | |

OTHER PUBLICATIONS

Jared Petker: "Point-in-Polygon Detection", Apr. 1, 2010 (Apr. 1, 2010), pp. 1-38, XP093162958, Retrieved from the Internet: URL:https://faculty.ucmerced.edu/kmitchell/Theses/jpetkerthesis.pdf [retrieved on May 15, 2024].

* cited by examiner

SYSTEMS AND METHODS FOR PROCESSING GEOGRAPHICAL ZONES

CROSS-REFERENCE TO RELATED APPLICATIONS

This application is a continuation of U.S. patent application Ser. No. 18/390,129 filed Dec. 20, 2023 and titled "SYSTEMS AND METHODS FOR PROCESSING GEOGRAPHICAL ZONES", which claims priority to U.S. Provisional Patent Application No. 63/440,143 filed Jan. 20, 2023 and titled "SYSTEMS AND METHODS FOR PROCESSING GEOGRAPHICAL ZONES", the contents of which are incorporated herein by reference for all purposes.

FIELD

The embodiments described herein generally relate to geographical zones, and in particular, to determining whether vehicles are located within geographical zones.

BACKGROUND

The following is not an admission that anything discussed below is part of the prior art or part of the common general knowledge of a person skilled in the art.

Geographical zones are virtual perimeters or virtual fences around real-world areas of interest. Geographical zones can be user generated (e.g., by manually defining boundaries) or automatically generated (e.g., based on historical telematics data). Geographical zones are often utilized by fleet management software to monitor and manage vehicle activity. However, as the geometry of a geographical zone becomes more complex, it can be computationally difficult to determine whether a vehicle is located within the geographical zone.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for determining whether a vehicle is located within a geographical zone. The method involves operating at least one processor to: define a bounding box surrounding the geographical zone; iteratively partition the bounding box into a plurality of bounding boxes by, starting with the bounding box in the first iteration: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes in the next iteration until each additional bounding box does not contain more than the predetermined maximum number of vertices; generate a binary tree data structure representing the geographical zone, the binary tree data structure including a plurality of parent nodes connected to a plurality of end nodes, each parent node representing a division of one of the bounding boxes into two additional bounding boxes, each end node representing one of the bounding boxes in the plurality of bounding boxes; identify the location of the vehicle based on telematics data received from a telematics device installed in the vehicle; and search the binary tree data structure using the location of the vehicle to determine whether the vehicle is located within one of the bounding boxes in the plurality of bounding boxes.

In some embodiments, searching the binary tree data structure can involve: evaluating a parent node by determining which of the two bounding boxes associated with the division represented by the parent node the vehicle is located.

In some embodiments, at least one bounding box in the plurality of bounding boxes can contain a portion of the geographical zone; and each end node associated with each bounding box in the at least one bounding box can further represent the portion of the geographical zone.

In some embodiments, searching the binary tree data structure can involve: determining whether the vehicle is located within the portion of the geographical zone represented by one of the end nodes using a point in polygon test.

In some embodiments, searching the binary tree data structure can involve: determining that the portion of the geographical zone represented by one of the end nodes occupies the entire bounding box represented by that end node.

In some embodiments, at least one bounding box in the plurality of bounding boxes does not contain a portion of the geographical zone.

In some embodiments, dividing the bounding box can involve positioning the axis to minimize empty space in one of the two additional bounding boxes.

In some embodiments, dividing the bounding box can involve positioning the axis so that each of the additional bounding boxes contains a predetermined minimum number of vertices.

In some embodiments, dividing the bounding box can involve positioning the axis at: i.) half the width of bounding box if the length of the bounding box is larger than the width of the bounding box, or ii.) half the length of the bounding box if the width of the bounding box is larger than the length of the bounding box.

In some embodiments, the at least one processor can be remotely located from the telematics device and the vehicle.

In accordance with a broad aspect, there is provided a system for determining whether a vehicle is located within a geographical zone. The system includes at least one data store operable to store the geographical zone; and at least one processor in communication with the at least one data store, the at least one processor operable to: define a bounding box surrounding the geographical zone; iteratively partition the bounding box into a plurality of bounding boxes by, starting with the bounding box in the first iteration: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes in the next iteration until each additional bounding box does not contain more than the predetermined maximum number of vertices; generate a binary tree data structure representing the geographical zone, the binary tree data structure including a plurality of parent nodes connected to a plurality of end nodes, each parent node representing a division of one of the bounding boxes into two additional bounding boxes, each end node representing one of the bounding boxes in the plurality of bounding boxes; identify the location of the vehicle based on telematics data received from a telematics device installed in the vehicle; and search the binary tree data structure using the location of the vehicle to determine whether the vehicle is located within one of the bounding boxes in the plurality of bounding boxes.

In some embodiments, searching the binary tree data structure can involve: evaluating a parent node by determining which of the two bounding boxes associated with the division represented by the parent node the vehicle is located.

In some embodiments, at least one bounding box in the plurality of bounding boxes can contain a portion of the geographical zone; and each end node associated with each bounding box in the at least one bounding box can further represent the portion of the geographical zone.

In some embodiments, searching the binary tree data structure can involve: determining whether the vehicle is located within the portion of the geographical zone represented by one of the end nodes using a point in polygon test.

In some embodiments, searching the binary tree data structure can involve: determining that the portion of the geographical zone represented by one of the end nodes occupies the entire bounding box represented by that end node.

In some embodiments, at least one bounding box in the plurality of bounding boxes does not contain a portion of the geographical zone.

In some embodiments, dividing the bounding box can involve positioning the axis to minimize empty space in one of the two additional bounding boxes.

In some embodiments, dividing the bounding box can involve positioning the axis so that each of the additional bounding boxes contains a predetermined minimum number of vertices.

In some embodiments, dividing the bounding box can involve positioning the axis at: i.) half the width of bounding box if the length of the bounding box is larger than the width of the bounding box, or ii.) half the length of the bounding box if the width of the bounding box is larger than the length of the bounding box.

In some embodiments, the at least one processor can be remotely located from the telematics device and the vehicle.

In accordance with a broad aspect, there is provided a method for processing a geographical zone. The method involves operating at least one processor to: define a bounding box surrounding the geographical zone; iteratively partition the bounding box into a plurality of bounding boxes by: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes until each additional bounding box does not contain more than the predetermined maximum number of vertices; and generate a binary tree data structure representing the geographical zone, the binary tree data structure including a plurality of parent nodes connected to a plurality of end nodes, each parent node representing a division of one of the bounding boxes into two additional bounding boxes, each end node representing one of the bounding boxes.

In accordance with a broad aspect, there is provided a system for processing a geographical zone. The system includes: at least one data store operable to store the geographical zone; and at least one processor in communication with the at least one data store, the at least one processor operable to: define a bounding box surrounding the geographical zone; iteratively partition the bounding box into a plurality of bounding boxes by: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes until each additional bounding box does not contain more than the predetermined maximum number of vertices; and generate a binary tree data structure representing the geographical zone, the binary tree data structure including a plurality of parent nodes connected to a plurality of end nodes, each parent node representing a division of one of the bounding boxes into two additional bounding boxes, each end node representing one of the bounding boxes.

In accordance with a broad aspect, there is provided a method for processing a geographical zone. The method involves operating at least one processor to: define a bounding box surrounding the geographical zone; iteratively partition the bounding box into a plurality of bounding boxes by: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes until each additional bounding box does not contain more than the predetermined maximum number of vertices.

In accordance with a broad aspect, there is provided a system for processing a geographical zone. The system includes: at least one data store operable to store the geographical zone; and at least one processor in communication with the at least one data store, the at least one processor operable to: define a bounding box surrounding the geographical zone; iteratively partition the bounding box into a plurality of bounding boxes by: determine whether the bounding box contains more than a predetermined maximum number of vertices; divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and repeat the steps of determining and dividing the bounding box for the additional bounding boxes until each additional bounding box does not contain more than the predetermined maximum number of vertices.

In accordance with a broad aspect, there is provided a non-transitory computer readable medium having instructions stored thereon executable by at least one processor to implement any method herein.

BRIEF DESCRIPTION OF THE DRAWINGS

Several embodiments will be described in detail with reference to the drawings, in which.

Figure 1:
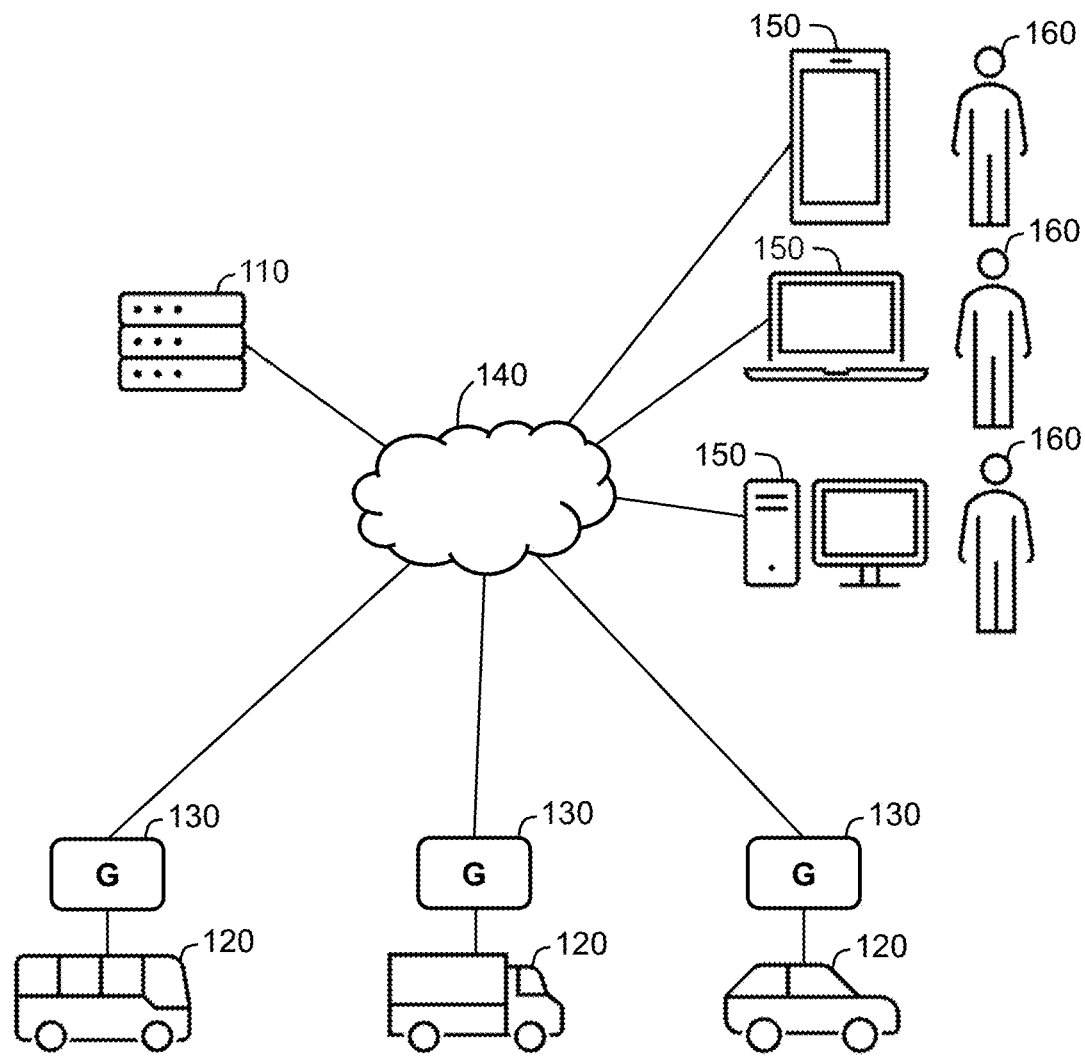
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120. The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
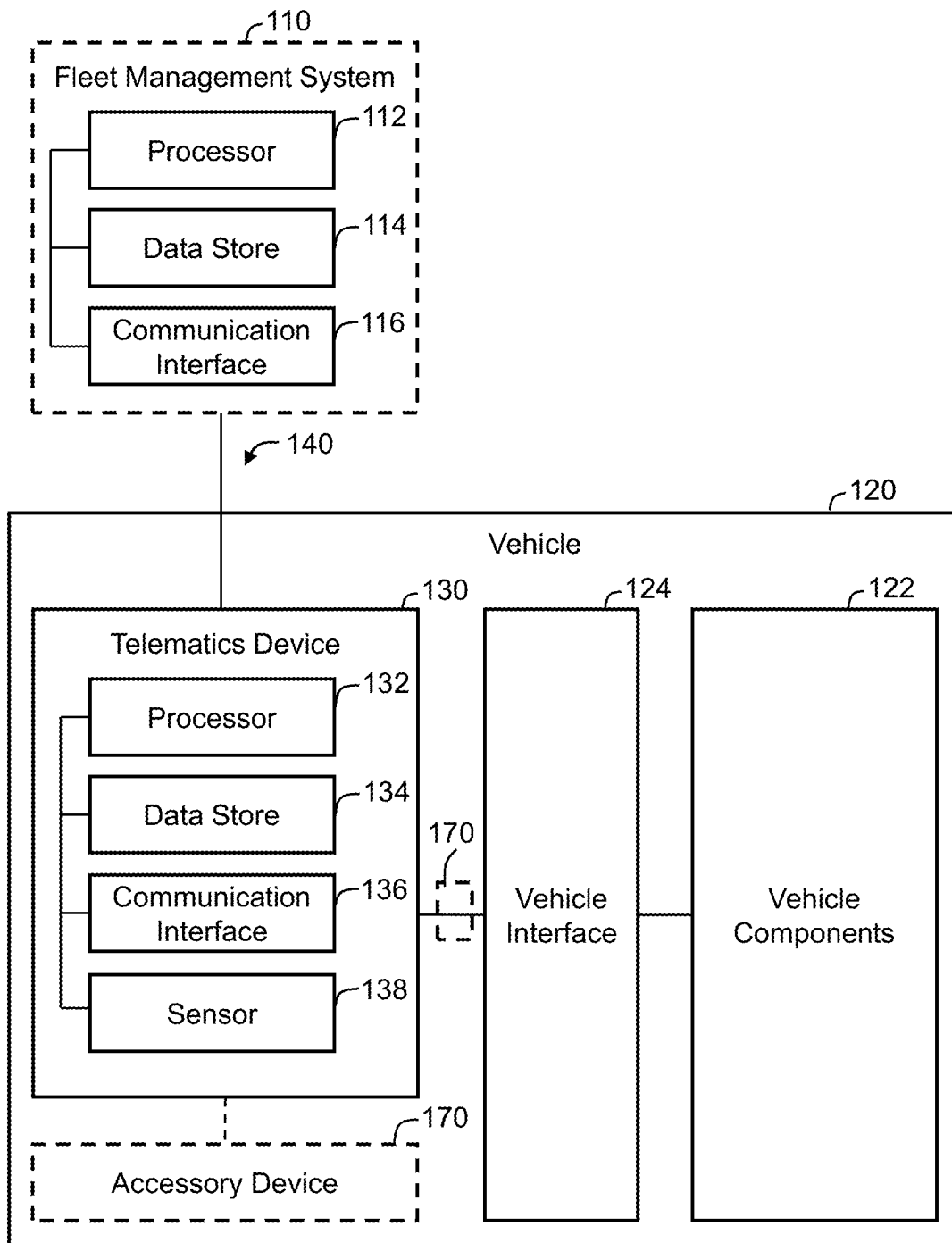
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 is in communication with a telematics device 130 that is installed in a vehicle 120.

As shown, the fleet management system 110 can include one or more processors 112, one or more data stores 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data stores 114 to implement various methods described herein. For example, the processors 112 may process various telematics data collected by the fleet management system 110 from the telematics device 130.

The data stores 114 can store various data for the fleet management system 110. The data stores 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data stores 114 may include volatile memory, non-volatile memory, or a combination thereof. The data stores 114 may include non-transitory computer readable media. The data stores 114 can store various computer instructions, programs, and/or software that can be executed by the processors 112 to implement various methods described herein. The data stores 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data stores 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data stores 134. For example, the processors 132 can process various telematics data gathered from the vehicle components 122 or the sensors 138.

The data stores 134 can store various data for the telematics device 130. Like the data stores 114 of the fleet management system 110, the data stores 134 of the telematics device 130 can be implemented using any suitable data storage devices or systems. The data stores 134 can store various computer instructions, programs, and/or software that can be executed by the processors 132. The data stores 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
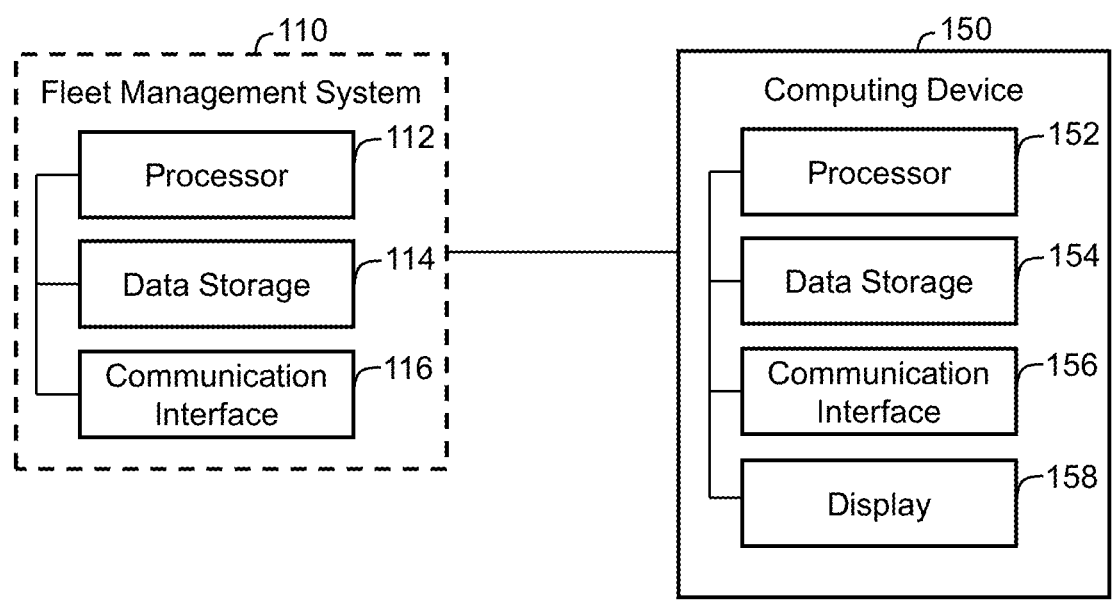
FIG. 3 is a block diagram of an example fleet management system interacting with an example computing device, in accordance with an embodiment.

Reference will now be made to FIG. 3 to further explain the operation of the fleet management system 110 and computing devices 150. In the illustrated example, the fleet management system 110 is in communication with a computing device 150. As shown, the computing device 150 also can include one or more processors 152, one or more data stores 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data stores 154 to implement various methods described herein. For example, the processors 152 may process various telematics data received from the fleet management system 110 and/or the telematics device 130.

The data stores 154 can store various data for the computing device 150. Like the data stores 114 of the fleet management system 110 and the data stores 134 of the telematics device 130, the data stores 154 of the computing device 150 can be implemented using any suitable data storage devices or systems. The data stores 154 can store various computer instructions, programs, and/or software that can be executed by the processor 152 to implement various methods described herein. The data stores 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150.

For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4A:
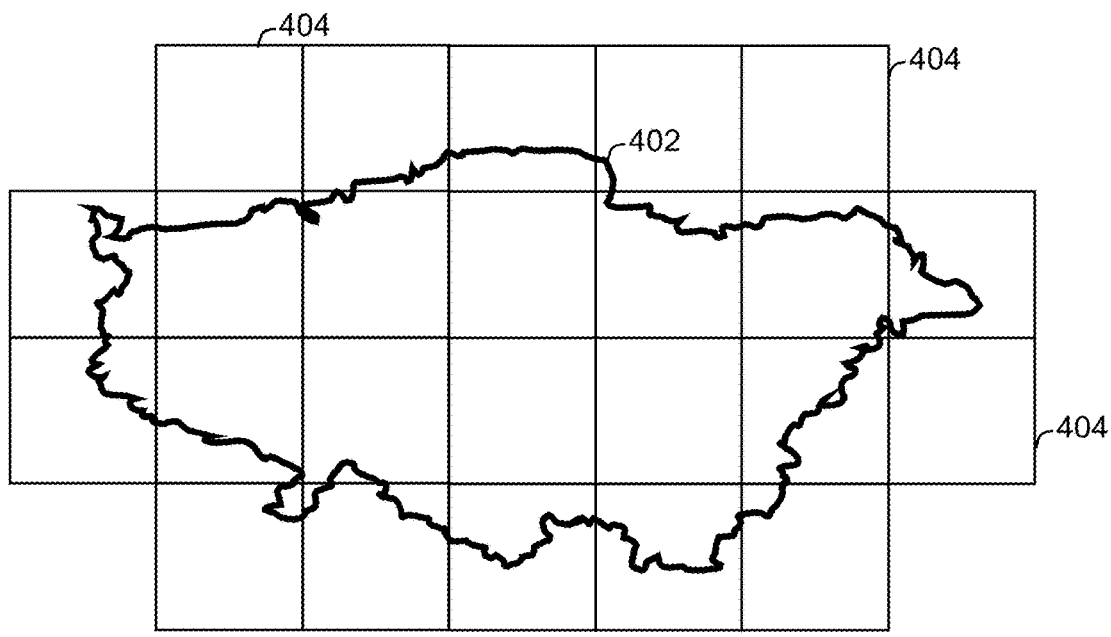
FIGS. 4A and 4B are illustrations of example geographical zones, in accordance with an embodiment.
Figure 4B:
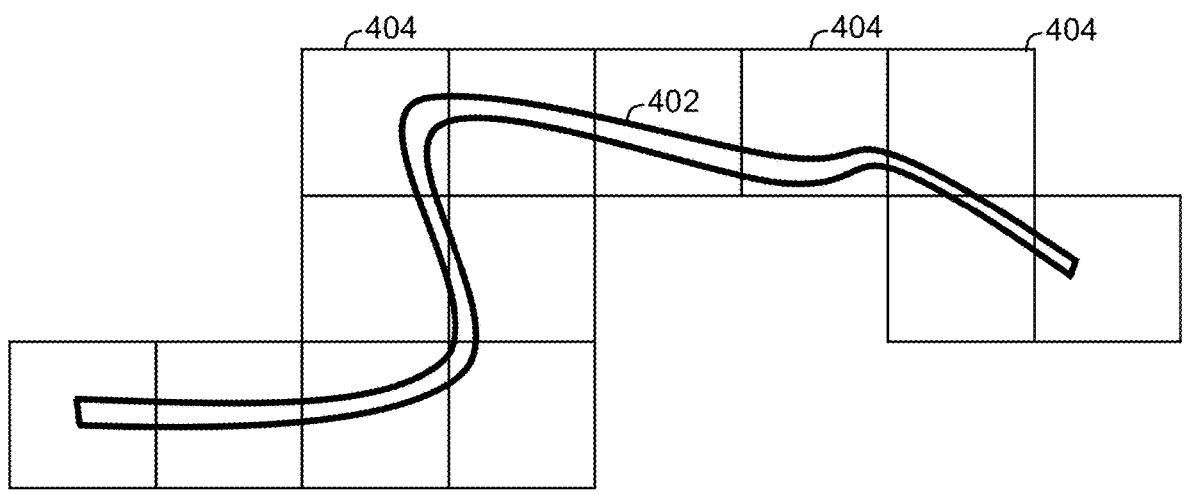

Reference will now be made to FIGS. 4A and 4B, which illustrate example geographical zones 402, which may be utilized by the fleet management system 110, computing devices 150, and/or telematics devices 130. The geographical zones 402 can be used to monitor and manage vehicle activity. For example, a geographical zone 402 may be used identify vehicles 120 that are within, entering, or exiting the zone 402. This can be used to determine whether actions performed by the vehicle 120 (e.g., speeding, idling, u-turning, etc.) are allowed or disallowed based on the zone 402. The geographical zones 402 can be user generated (e.g., by manually defining boundaries using fleet management software) or automatically generated (e.g., based on historical telematics data using fleet management software).

In the illustrated example, the geographical zones 402 have complex geometries and are represented by polygons having many vertices. In the example illustrated in FIG. 4A, the geographical zone 402 represents a political border that may be defined by various geographic features (e.g., bodies of water, forests, mountain ranges, etc.) and/or political entities (e.g., cities, regions, counties, provinces, states, nations, etc.). On the other hand, in the example illustrated in FIG. 4B, the geographical zone 402 represents a road (e.g., street, collector, arterial, highway, expressway, freeway etc.) having several turns and bends. As shown, geographical zones 402 having complex geometries may contain hundreds, thousands, millions, or more vertices.

Various point in polygon algorithms can be used to determine whether a given vehicle 120 (i.e., point) is located within a given geographical zone 402 (i.e., polygon). For instance, one example of a point on polygon algorithm is a ray casting algorithm (also known as a crossing number algorithm or even-odd rule algorithm). A ray casting algorithm determines how many times a ray, starting from a given point and going in any fixed direction, intersects the edges of the polygon. If the ray intersects the edges of the polygon an even number of times, the point is outside of the polygon. If the ray intersects the edges of the polygon an odd number of times, the point is inside of the polygon. Another example of a point in polygon algorithm is a winding number algorithm (also known as non-zero rule algorithm). A winding number algorithm determines a given point's winding number with respect to the polygon (i.e., the number of times the polygonal boundary winds around the point). If the winding number is zero, the point is outside of the polygon. If the winding number is non-zero, the point is inside the polygon.

The computational complexity of point in polygon algorithms increases with the number of vertices of the polygon. Hence, significant computing resources may be required to process complex geometries having many vertices. At scale, it may become impractical to process complex geographical zones 402 for large numbers of vehicles 120 (e.g., hundreds, thousands, millions, or more). One potential solution to reduce the number of vertices of a geographic zone 402 is to divide the zone 402 into a plurality of sub-zones 404. For instance, as shown in FIGS. 4A and 4B, the geographical zones 402 can be partitioned into sub-zones 404. However, if the geometry is sufficiently complex, the sub-zones 404 may still be difficult to effectively process at scale. The inventors recognized and realized that certain ways of iteratively partitioning a geographical zone 402 could effectively reduce the number of vertices to be processed at scale.

Figure 5:
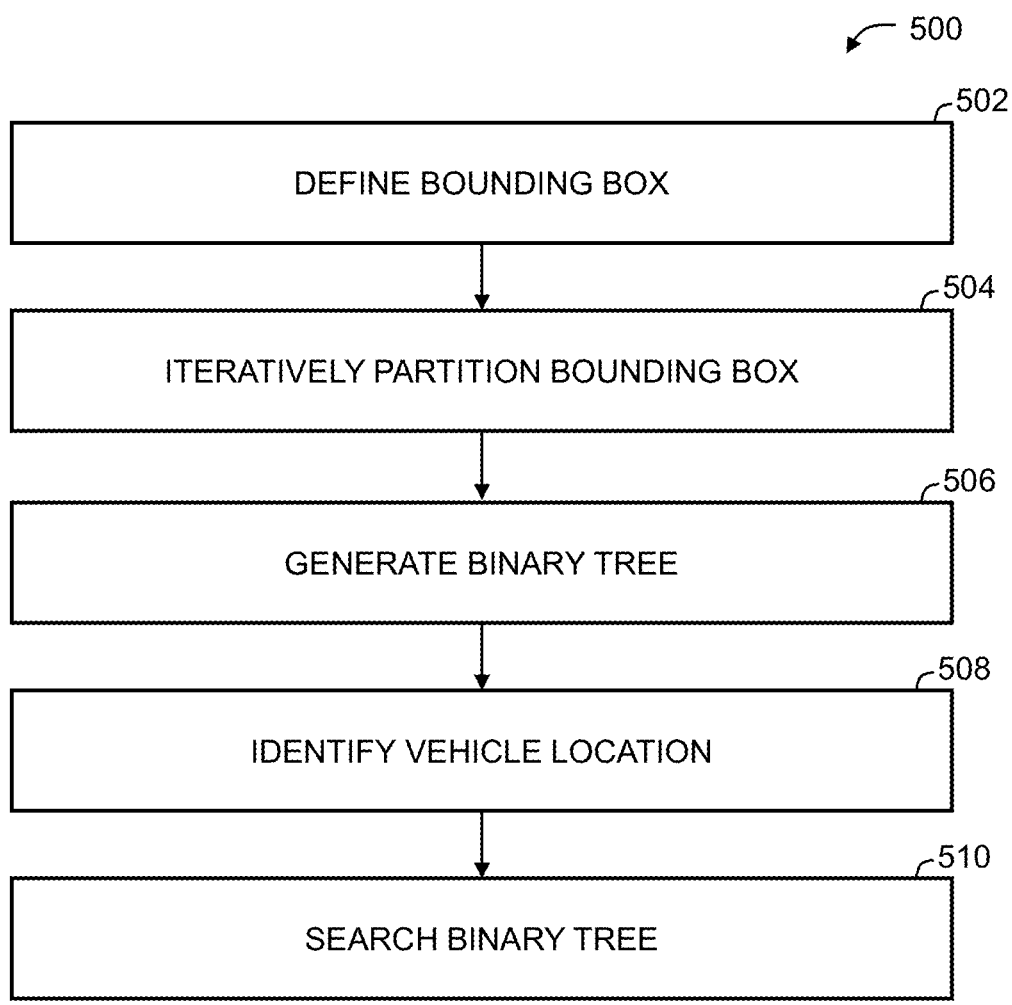
FIG. 5 is a flowchart of an example method for processing geographical zones, in accordance with an embodiment.

Reference will now be made to FIG. 5, which illustrates an example method 500 for processing a geographical zone 402. The zone processing method 500 can be used to determine whether a given point is located within the geographical zone 402. For example, the zone processing method 500 can be used to determine whether a vehicle 120 is within the geographical zone. The zone processing method 500 can iteratively partition the geographical zone 402 to reduce the amount of computational resources required to determine whether a vehicle 120 is located within the geographic zone 402.

The zone processing method 500 can be implemented using the fleet management system 110, one or more telematics devices 130, one or more computing devices 150, or a combination thereof. For example, the zone processing method 500 may be implemented by one or more processors 112, 132, 152 executing instructions stored on one or more data stores 114, 134, 154. An advantage of implementing at least a portion of the zone processing method 500 at the fleet management system 110 (i.e., remote from telematics devices 130 and computing devices 150) is that less processing may be executed at the telematics devices 130 and/or computing devices 150. Hence, the hardware complexity and cost of the telematics devices 130 and/or computing devices 150 can be reduced. Furthermore, it may be easier to update and/or modify software running on the fleet management system 110 as compared to the telematics devices 130 and/or computing devices 150. An advantage of implementing at least a portion of the zone processing method 500 at the telematics devices 130 and/or computing devices 150 (i.e., remote from the fleet management system 110) is that less data may be transmitted between the fleet management system 110 and the telematics devices 130 and/or computing device 150. Hence, network usage and bandwidth on the network 140 can be reduced. This may reduce usage costs associated with the network 140.

At 502, an initial bounding box can be defined that surrounds the geographical zone 402. The initial bounding box can be defined as the minimum or smallest box that bounds or encloses the geographical zone 402. In other words, the initial bounding box can be the box with the smallest area within which all of the geographical zone 402 lies.

Figure 6:
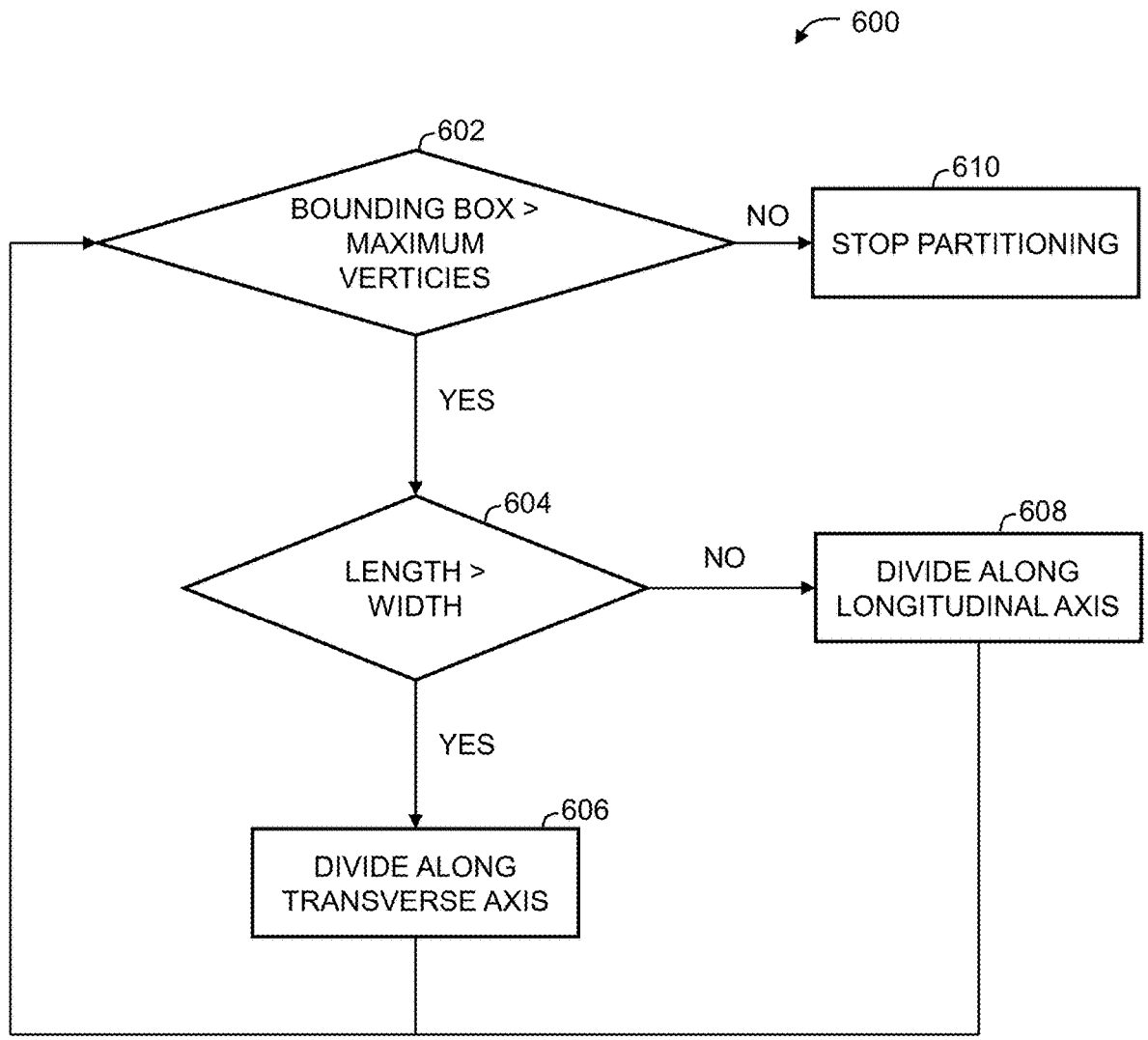
FIG. 6 is a flowchart of an example method for iteratively partitioning bounding boxes, in accordance with an embodiment.

At 504, the initial bounding box can be iteratively partitioned into a plurality of bounding boxes, starting with the initial bounding box in the first iteration. Each bounding box may contain a portion of the geographical zone 402. Reference will now be made to FIG. 6, which shows an example method 600 for iteratively partitioning a bounding box.

At 602, it can be determined whether the bounding box contains more than a predetermined maximum number of vertices. If the bounding box contains more than the predetermined maximum number of vertices, the iterative partitioning method 600 can proceed to 604 so that the bounding box can be divided into additional bounding boxes having fewer vertices. Otherwise, (i.e., if the bounding box does not contain more than the predetermined maximum number of vertices) the iterative partitioning method 600 can proceed to 610, such that the bounding box is not divided.

At 604, it can be determined whether the length of the bounding box is greater than the width of the bounding box. If the length of the bounding box is greater than the width of the bounding box, the iterative partitioning method 600 can proceed to 606. Otherwise, (i.e., if the width of the bounding box is greater than the length of the bounding box), the iterative partitioning method 600 can proceed to 608.

At 606, the bounding box can be divided into two additional bounding boxes along an axis that is parallel a transverse axis of the bounding box. In other words, the bounding box can be divided across the length dimension of the bounding box and along the width dimension of the bounding box. In this manner, the bounding box is divided across the longest dimension (i.e., the length) of the bounding box.

At 608, the bounding box can be divided into two additional bounding boxes along an axis that is parallel a longitudinal axis of the bounding box. In other words, the bounding box can be divided across the width dimension of the bounding box and along the length dimension of the bounding box. In this manner, the bounding box is divided across the longest dimension (i.e., the width) of the bounding box.

The axis used to divide the bounding box at 606 or 608 may be positioned in various ways. For example, in some cases, the axis may be positioned at halfway along the longest dimension (i.e., half the length of bounding box at 606 or half the width of the bounding box at 608). In other cases, the axis may be positioned to minimize empty space in one of the two additional bounding boxes. In yet other cases, the axis may be positioned so that each of the additional bounding boxes contains a predetermined minimum number of vertices.

As shown, each additional bounding box generated at 606 or 608 can be further processed in the next iteration of the iterative partitioning method 600. That is, it can be determined whether each additional bounding box contains more than the predetermined maximum number of vertices at 602 and if so, the additional bounding boxes can be further divided into further additional bounding boxes at 606 or 608. The iterative partitioning method 600 can repeat until each bounding box does not contain more than the predetermined maximum number of vertices and are therefore not divided any further at 610.

Referring back to FIG. 5, at 506, a binary tree structure can be generated. The binary tree structure can represent the geographical zone 402 and contain a plurality of parent nodes connecting to a plurality of end nodes. Each parent node can represent a division of one of the bounding boxes into two additional bounding boxes (i.e., at 606 or 608) and each end node can represent one of the bounding boxes in the plurality of bounding boxes (i.e., at 610). Each end node may be associated with a portion of the geographical zone 402 that is contained within an associated bounding box.

At 508, the location of the vehicle 120 can be identified. For example, the location of the vehicle 120 can be identified based on telematics data received from a telematics device 130 installed in the vehicle 120. As described herein, the telematics device 130 may include a GPS (global positioning system) receiver, which can be used to determine the location of the vehicle 120. The location of the vehicle 120 may be retrieved from a computing device 150, fleet management system 110, and/or telematics device 130.

At 510, the binary tree data structure can be searched using the location of the vehicle 120. The binary tree data structure can be searched to determine whether the vehicle 120 is located within one of the bounding boxes in the plurality of bounding boxes. The binary tree data structure can be searched by evaluating various parent nodes, starting with the parent node representing the first division of the initial bounding box, to identify an end node. At a given parent node, it can be determined which of the two bounding boxes associated with the division represented by that parent node the vehicle 120 is located within. Based on that determination, another node (i.e., another parent node or an end node) can be identified and evaluated. Once an end node is identified, it can be determined that the vehicle 120 is located within the bounding box associated with that end node.

The end node can be evaluated to determine whether the vehicle 120 is located within the portion of the geographical zone 402 contained within the bounding box associated with the end node. As described herein, a point in polygon test can be used to determine whether the vehicle is located within that the portion of the geographical zone 402. Since the portion of the geographical zone 402 contained within the bounding box does not contain more than the predetermined maximum number of vertices, the point in polygon test can be performed efficiently. Furthermore, since each evaluation of a parent node is computationally simple, the overall search can be performed with a practical amount computational resources at scale. This can be significantly more efficient than simply performing a point in polygon test on the entire geographical zone 402 due to its many vertices.

Figure 7A:
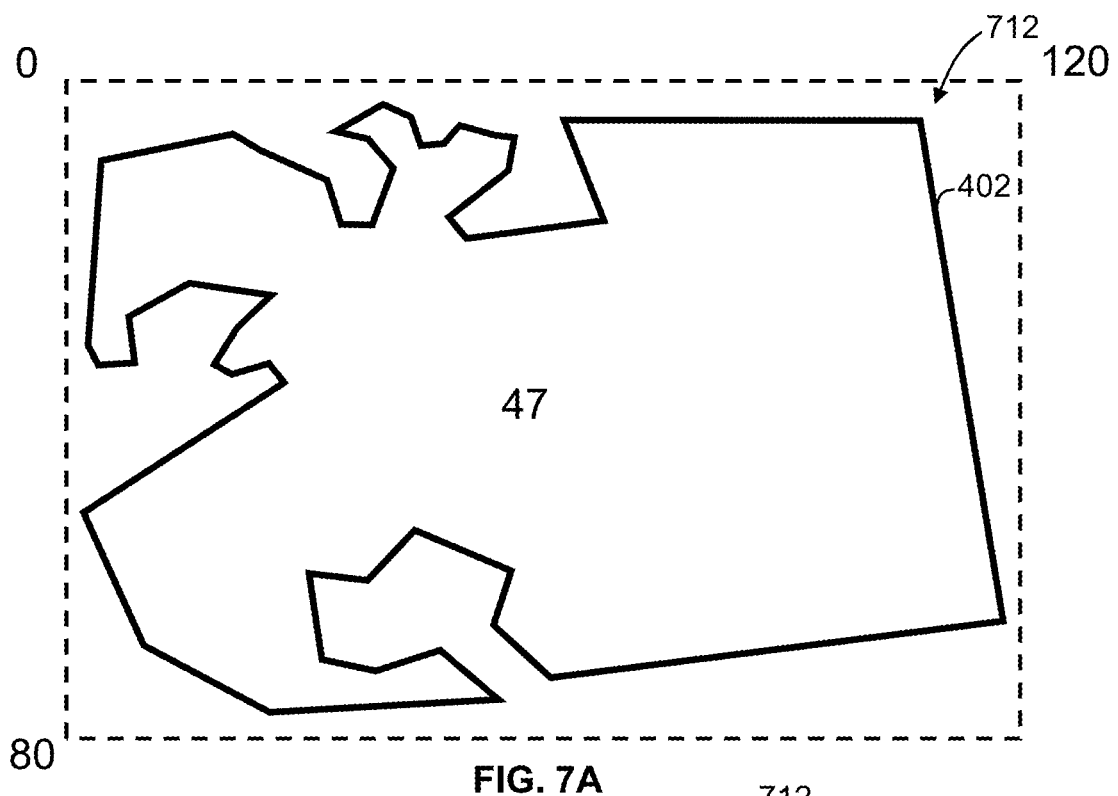
FIGS. 7A-E are illustrations of an example geographical zone being iteratively partitioned, in accordance with an embodiment.
Figure 7B:
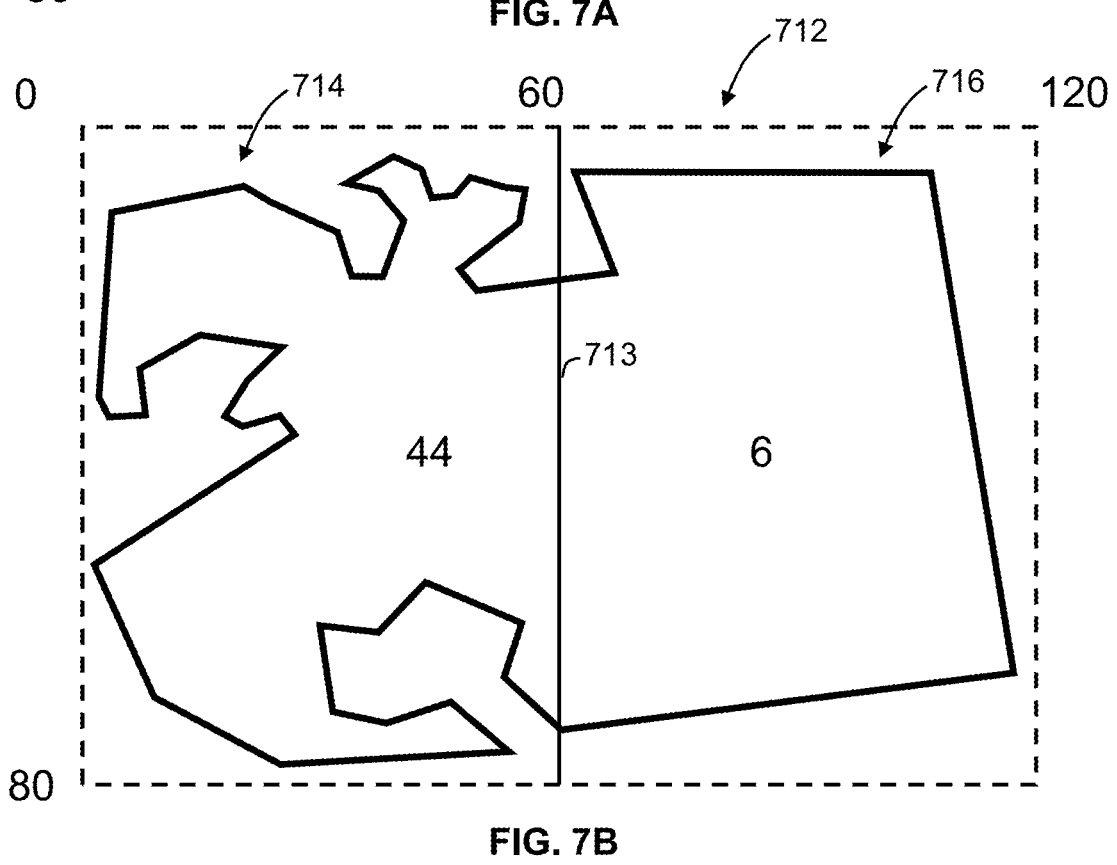
Figure 7C:
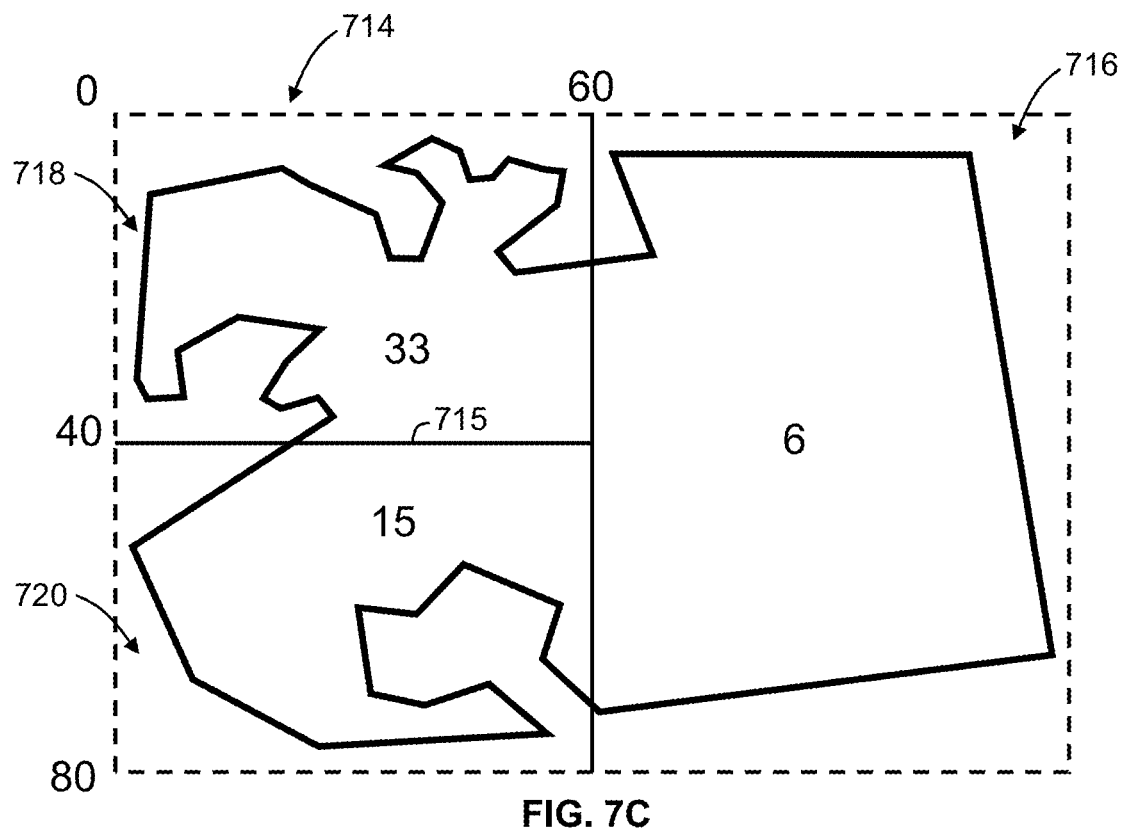
Figure 7D:
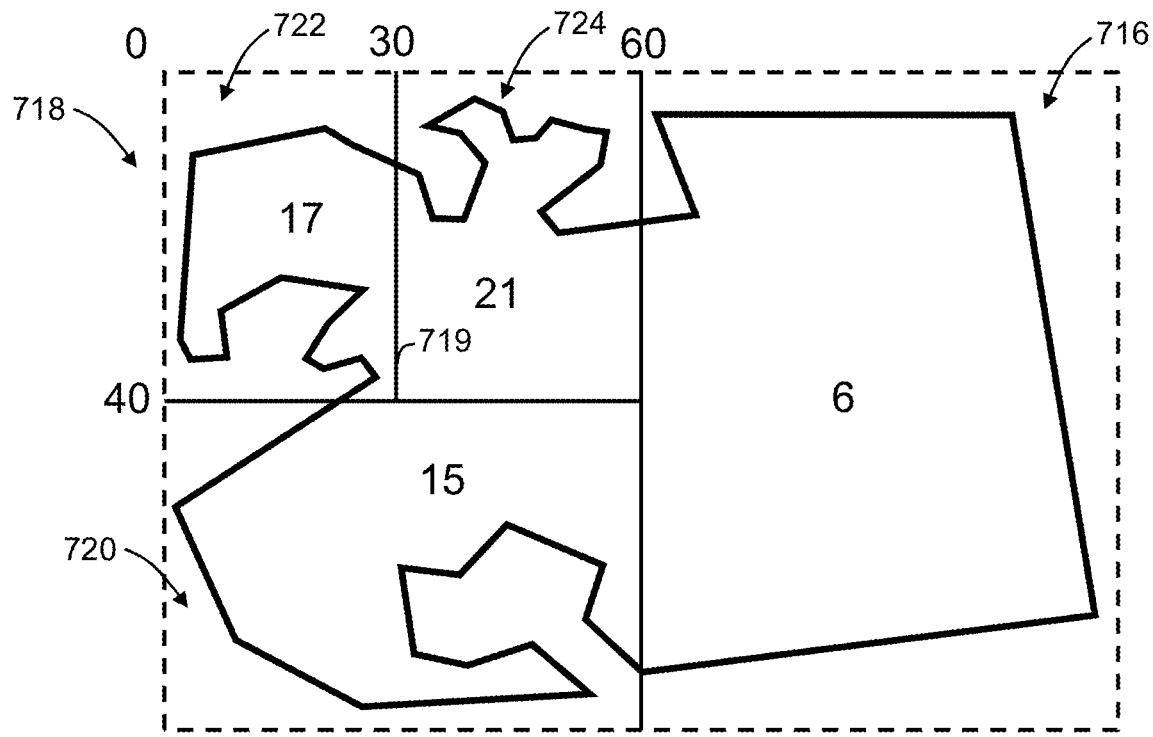
Figure 7E:
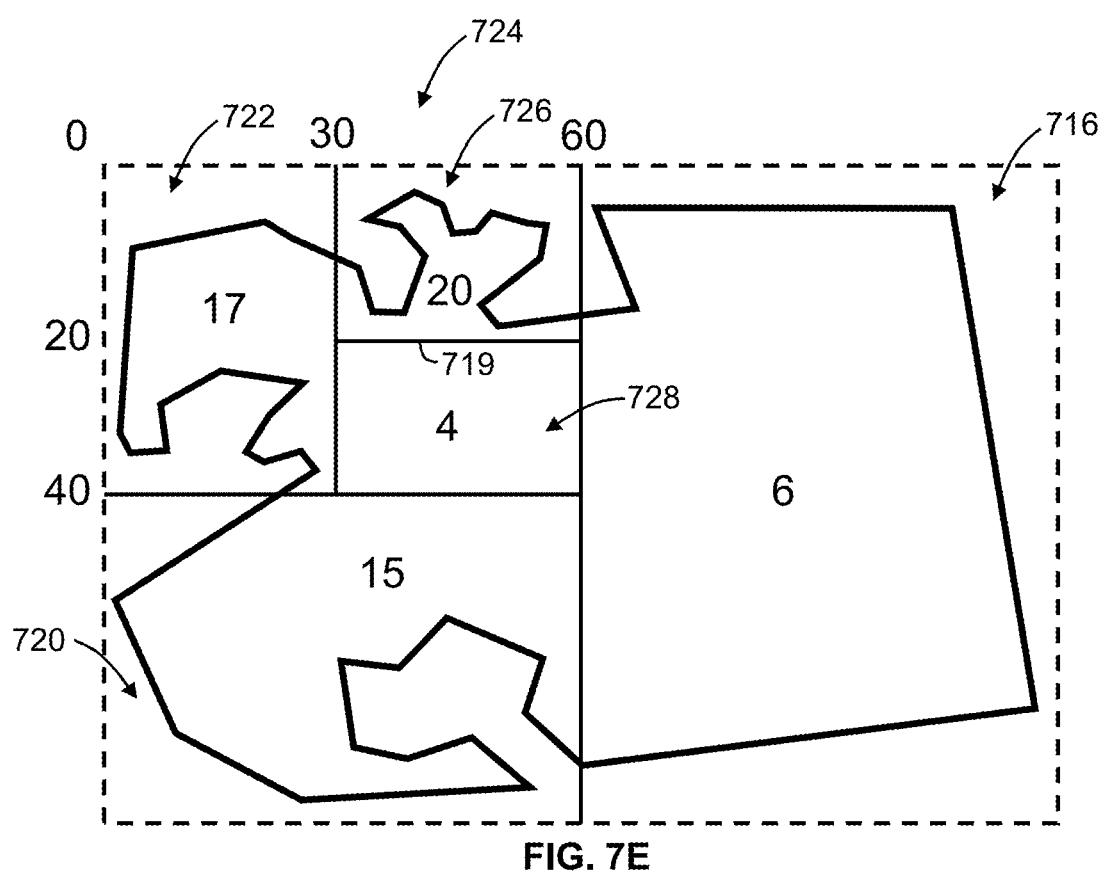
Figure 8:
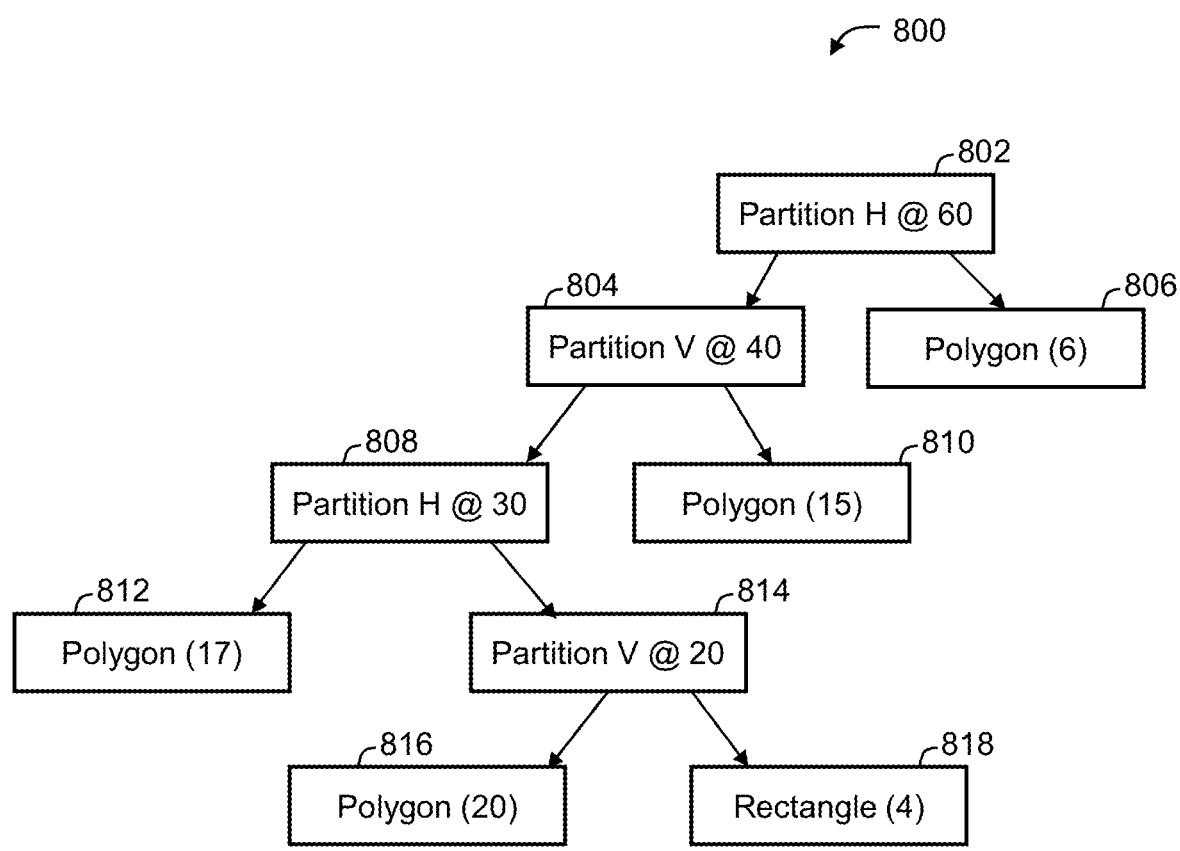
FIG. 8 is an illustration of an example binary tree data structure, in accordance with an embodiment.

Reference will now be made to FIGS. 7A-7E and 8, to illustrate an example execution of the zone processing method 500 and the iterative partitioning method 600. FIGS. 7A-E show an example geographical zone 402 being divided into a plurality of bounding boxes (i.e., bounding boxes 716, 720, 722, 726, 728), starting with an initial bounding box 712. FIG. 8 shows an example binary tree structure 800 representing the geographical zone 402 and bounding box divisions shown in FIGS. 7A-E. In the illustrated example, the predetermined maximum number of vertices was selected to be 20. That is, bounding box 712 is partitioned into a plurality of bounding boxes that each contain less than or equal to 20 vertices. It should be appreciated that the predetermined maximum number of vertices may vary and can be any number. The predetermined maximum number of vertices may be selected based on the amount of computational resources available.

FIG. 7A shows an initial bounding box 712 being defined (i.e., at 502) that surrounds the geographical zone 402. The bounding box 712 can be iteratively partitioned into a plurality of bounding boxes (i.e., at 504 using iterative partitioning method 600). Since bounding box 712 contains 47 vertices, it can be determined that bounding box 712 contains more vertices than the predetermined maximum number of vertices (i.e., at 602). Hence, bounding box 712 can be partitioned into additional bounding boxes to reduce the number of vertices contained therein. Since bounding box 712 has a length of 120 and a width of 80, it can be determined that the length of bounding box 712 is greater than its width (i.e., at 604).

FIG. 7B shows bounding box 712 being divided into two additional bounding boxes 714, 716. Since the length of bounding box 712 is greater than its width, bounding box 712 is divided along an axis 713 that is parallel a transverse axis of the bounding box 712 (i.e., at 606). In other words, bounding box 712 is divided across the longest dimension (i.e., length). Since bounding box 716 contains 6 vertices, it can be determined that bounding box 716 does not contain more than the predetermined maximum number of vertices (i.e., at 602), and bounding box 716 does not need to be further partitioned (i.e., at 610). On the other hand, since bounding box 714 contains 44 vertices, it can be determined that bounding box 714 contains more than the predetermined maximum number of vertices (i.e., at 602). Hence, bounding box 714 can be partitioned into additional bounding boxes to reduce the number of vertices contained therein. Since bounding box 714 has a length of 60 and a width of 80, it can be determined that the width of bounding box 714 is greater than its length (i.e., at 604).

FIG. 7C shows bounding box 714 being divided into two additional bounding boxes 718, 720. Since the width of bounding box 714 is greater than its length, bounding box 714 is divided along an axis 715 that is parallel to a longitudinal axis of the bounding box 714 (i.e., at 608). In other words, bounding box 714 is divided across the longest dimension (i.e., width). Since bounding box 720 contains 15 vertices, it can be determined that bounding box 720 does not contain more than the predetermined maximum number of vertices (i.e., at 602), and bounding box 720 does not need to be further partitioned (i.e., at 610). On the other hand, since bounding box 718 contains 33 vertices, it can be determined that bounding box 718 contains more than the predetermined maximum number of vertices (i.e., at 602). Hence, bounding box 718 can be further partitioned to reduce the number of vertices contained therein. Since bounding box 718 has a length of 60 and a width of 40, it can be determined that the length of bounding box 718 is greater than its width (i.e., at 604).

FIG. 7D shows bounding box 718 being divided into two additional bounding boxes 722, 724. Since the length of bounding box 718 is greater than its width, bounding box 718 is divided along an axis 719 that is parallel to a transverse axis of the bounding box 718 (i.e., at 608). In other words, bounding box 718 is divided across its longest dimension (i.e., length). Since bounding box 722 contains 17 vertices, it can be determined that bounding box 722 does not contain more than the predetermined maximum number of vertices (i.e., at 602), and bounding box 722 does not need to be further partitioned (i.e., at 610). On the other hand, since bounding box 724 contains 21 vertices, it can be determined that bounding box 724 contains more than the predetermined maximum number of vertices (i.e., at 602). Hence, bounding box 724 can be further partitioned to reduce the number of vertices contained therein. Since bounding box 724 has a length of 30 and a width of 40, it can be determined that the width of bounding box 724 is greater than its length (i.e., at 604).

FIG. 7E shows bounding box 724 being divided into two additional bounding boxes 726, 728. Since the width of bounding box 724 is greater than its length, bounding box 724 is divided along an axis 725 that is parallel to a longitudinal axis of the bounding box 724 (i.e., at 608). In other words, bounding box 724 is divided across its longest dimension (i.e., width). Since bounding box 726 contains 20 vertices and bounding box 728 contains 4 vertices, it can be determined that bounding boxes 726 and 728 do not contain more than the predetermined maximum number of vertices (i.e., at 602), and therefore bounding boxes 726 and 728 do not need to be further partitioned (i.e., at 610).

As shown, the method 600 can iteratively partition bounding box 712 into a plurality of bounding boxes (i.e., bounding boxes 716, 720, 722, 726, 728). Each of the bounding boxes 716, 720, 722, 726, 728 does not contain more than the predetermined maximum number of vertices. Each bounding box contains a portion of the geographical zone 402.

FIG. 8 shows an example binary tree structure 800 that can be generated (i.e., at 506), which represents the geographical zone 402 and bounding box divisions shown in FIGS. 7A-7E. As shown, the binary tree structure 800 includes a plurality of parent nodes (i.e., parent nodes 802, 804, 808, 814) connecting to a plurality of end nodes (i.e., end nodes 806, 810, 812, 816, 818).

Each parent node represents a division of one of the bounding boxes into two additional bounding boxes. For example, parent node 802 can represent the division of bounding box 712 into bounding boxes 714 and 716 (i.e., in FIG. 7B). Similarly, parent node 804 can represent the division of bounding box 714 into bounding boxes 718 and 720 (i.e., in FIG. 7C). Likewise, parent node 808 can represent the division of bounding box 718 into bounding boxes 722 and 724 (i.e., in FIG. 7D). As well, parent node 814 can represent the division of bounding box 724 into bounding boxes 726 and 728 (i.e., in FIG. 7E). As shown, each parent node can represent the direction and position of the division of the bounding boxes.

Each end node represents one of the bounding boxes in the plurality of bounding boxes. For example, end node 806 can represent bounding box 716 (i.e., in FIG. 7B). Similarly, end node 810 can represent bounding box 720 (i.e., in FIG. 7C). Likewise, end node 812 can represent bounding box 722 (i.e., in FIG. 7D). As well, end node 816 can represent bounding box 726 and end node 818 can represent bounding box 728 (in FIG. 7E).

The binary tree structure 800 can be searched (i.e., at 510) to determine whether a given location (e.g., vehicle 120) is within one of the bounding boxes. As described herein, the binary tree data structure 800 can be searched by evaluating various parent nodes, starting with the parent node 802 representing the first division of the initial bounding box 712, to identify an end node. For example, at parent node 802, it can be determined which of the two bounding boxes 714, 716 associated with the division associated with parent node 802 the location is positioned within. If the location is within bounding box 714, parent node 804 can be identified and evaluated. Otherwise (i.e., if the location is within bounding box 716), end node 806 can be identified.

At parent node 804, it can be determined which of the two bounding boxes 718, 720 associated with parent node 804 that the location is positioned within. If the location is within bounding box 718, parent node 808 can be identified and evaluated. Otherwise (i.e., if the location is within bounding box 720), end node 810 can be identified.

At parent node 808, it can be determined which of the two bounding boxes 722, 724 associated with parent node 808 that the location is positioned within. If the location is within bounding box 724, parent node 814 can be identified and evaluated. Otherwise (i.e., if the location is within bounding box 722), end node 812 can be identified.

At parent node 814, it can be determined which of the two bounding boxes 726, 728 associated with parent node 814 that the location is positioned within. If the location is within bounding box 726, end node 816 can be identified. Otherwise (i.e., if the location is within bounding box 728), end node 818 can be identified.

As described herein, once an end node is identified, the end node can be evaluated to determine whether the location is within the portion of the geographical zone 402 contained within the bounding box associated with the end node. For example, a point in polygon test can be used to determine whether the location is within the portion of the geographical zone 402 associated with the end node.

In some cases, it can be determined whether the portion of the geographical zone 402 represented by an end node occupies the entire bounding box associated with that end node. In such cases, it may not be necessary to perform a point in polygon test. For instance, in the illustrated example, the portion of the geographical zone associated with end node 818 occupies the entirety of bounding box 728. Hence, anything located within bounding box 728 must also be located within the geographical zone 402. Accordingly, a point in polygon test does not need to be performed.

Figure 9A:
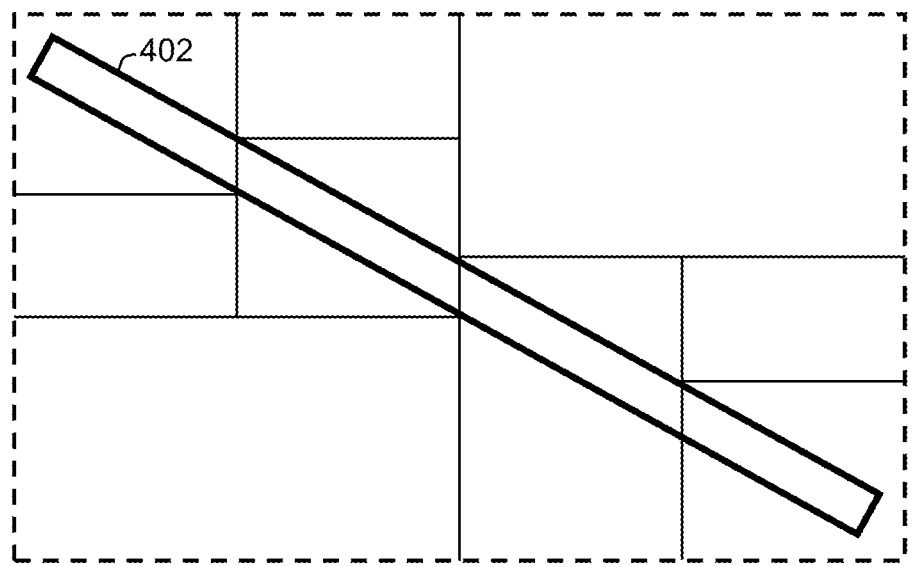
FIGS. 9A-B are illustrations of example geographical zones being iteratively partitioned, in accordance with an embodiment.
Figure 9B:
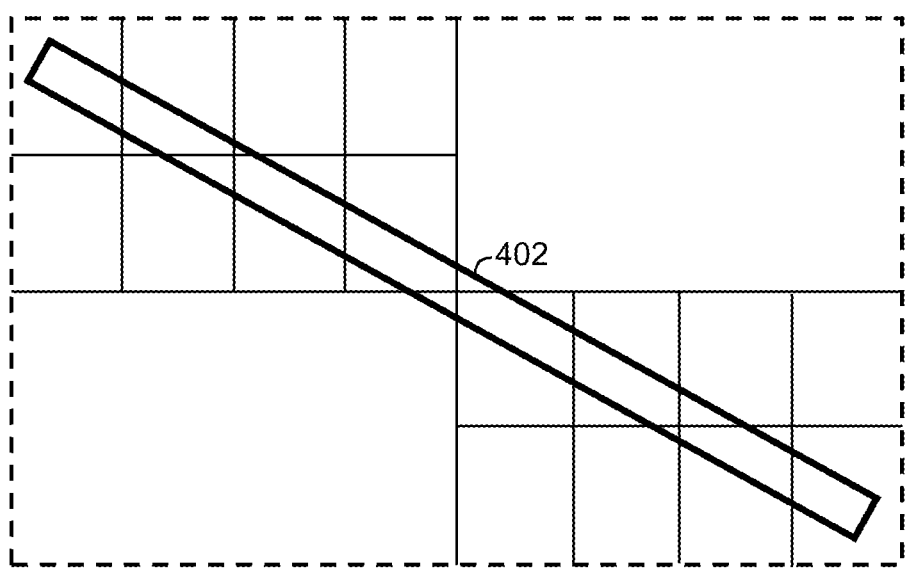

Referring now to FIGS. 9A and 9B, there is shown further examples of geographical zones 402 that can be processed by the zone processing method 500 and the iterative partitioning method 600. As shown, the positioning of the axis used to divide a bounding box (i.e., at 606 or 608) can influence the number of bounding boxes generated. In the example illustrated in FIG. 9B, the dividing axis is positioned at halfway along the longest dimension (i.e., half the length of bounding box at 606 or half the width of the bounding box at 608). On the other hand, in the example illustrated in FIG. 9B, the dividing axis is positioned to minimize empty space in one of the two additional bounding boxes. As shown, for certain geometries, by positioning the axis to minimize empty space, the number of bounding boxes can be reduced, and some bounding boxes may not contain a portion of the geographical zone 402. This may reduce the size of the resulting binary tree structure as well as the amount of computational resources required to search the binary tree structure.

In other embodiments, the dividing axis may be positioned so that each of the additional bounding boxes contains a predetermined minimum number of vertices. For certain geometries, this may also reduce the total number of bounding boxes, resulting in a smaller binary tree structure and more efficient search.

Although various embodiments are described herein using geographical zones and vehicles, it should be appreciated that the systems and methods described herein may used for other applications, for example, involving other polygons and points, and determining whether the points are within the polygons.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for processing a geographical zone, the system comprising:
   at least one data store operable to store the geographical zone; and
   at least one processor in communication with the at least one data store, the at least one processor operable to:
   define a bounding box surrounding the geographical zone;
      iteratively partition the bounding box into a plurality of bounding boxes by:
         determine whether the bounding box contains more than a predetermined maximum number of vertices;
      divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and
      repeat the steps of determining and dividing the bounding box for the additional bounding boxes until each additional bounding box does not contain more than the predetermined maximum number of vertices;
   identify a location of a vehicle based on telematics data received from a telematics device installed in the vehicle; and
   determine whether the vehicle is located within one of the bounding boxes in the plurality of bounding boxes.

2. The system of claim 1, wherein:
   at least one bounding box in the plurality of bounding boxes does not contain a portion of the geographical zone.

3. The system of claim 1, wherein dividing the bounding box comprises positioning the axis to minimize empty space in one of the two additional bounding boxes.

4. The system of claim 1, wherein dividing the bounding box comprises positioning the axis so that each of the additional bounding boxes contains a predetermined minimum number of vertices.

5. The system of claim 1, wherein dividing the bounding box comprises positioning the axis at: i.) half the width of bounding box if the length of the bounding box is larger than the width of the bounding box, or ii.) half the length of the bounding box if the width of the bounding box is larger than the length of the bounding box.

6. The system of claim 1, wherein the at least one processor is further operable to:
   generate a binary tree data structure representing the geographical zone, the binary tree data structure comprising a plurality of parent nodes connected to a plurality of end nodes, each parent node representing a division of one of the bounding boxes into two additional bounding boxes, each end node representing one of the bounding boxes.

7. The system of claim 6, wherein:
   at least one bounding box in the plurality of bounding boxes contains a portion of the geographical zone; and
   each end node associated with each bounding box in the at least one bounding box further represents the portion of the geographical zone.

8. The system of claim 6 wherein the at least one processor is further operable to:
   search the binary tree data structure using the location of the vehicle.

9. The system of claim 8, wherein searching the binary tree data structure comprises:
   evaluating a parent node by determining which of the two bounding boxes associated with the division represented by the parent node the vehicle is located.

10. A method for processing a geographical zone, the method comprising operating at least one processor to:
    define a bounding box surrounding the geographical zone;
    iteratively partition the bounding box into a plurality of bounding boxes by:
       determine whether the bounding box contains more than a predetermined maximum number of vertices;
       divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and
       repeat the steps of determining and dividing the bounding box for the additional bounding boxes until each additional bounding box does not contain more than the predetermined maximum number of vertices;
    identify a location of a vehicle based on telematics data received from a telematics device installed in the vehicle; and
    determine whether the vehicle is located within one of the bounding boxes in the plurality of bounding boxes.

11. The method of claim 10, wherein:
    at least one bounding box in the plurality of bounding boxes does not contain a portion of the geographical zone.

12. The method of claim 10, wherein dividing the bounding box comprises positioning the axis to minimize empty space in one of the two additional bounding boxes.

13. The method of claim 10, wherein dividing the bounding box comprises positioning the axis so that each of the additional bounding boxes contains a predetermined minimum number of vertices.

14. The method of claim 10, wherein dividing the bounding box comprises positioning the axis at: i.) half the width of bounding box if the length of the bounding box is larger than the width of the bounding box, or ii.) half the length of the bounding box if the width of the bounding box is larger than the length of the bounding box.

15. The method of claim 10, further comprising operating the at least one processor to:
generate a binary tree data structure representing the geographical zone, the binary tree data structure comprising a plurality of parent nodes connected to a plurality of end nodes, each parent node representing a division of one of the bounding boxes into two additional bounding boxes, each end node representing one of the bounding boxes.

16. The method of claim 15, wherein:
at least one bounding box in the plurality of bounding boxes contains a portion of the geographical zone; and
each end node associated with each bounding box in the at least one bounding box further represents the portion of the geographical zone.

17. The method of claim 15, further comprising operating the at least one processor to:
search the binary tree data structure using the location of the vehicle.

18. The method of claim 17, wherein searching the binary tree data structure comprises:
evaluating a parent node by determining which of the two bounding boxes associated with the division represented by the parent node the vehicle is located.

19. A non-transitory computer readable medium having instructions stored thereon executable by at least one processor to implement a method for processing a geographical zone, the method comprising operating at least one processor to:
define a bounding box surrounding the geographical zone;
iteratively partition the bounding box into a plurality of bounding boxes by:
determine whether the bounding box contains more than a predetermined maximum number of vertices;
divide the bounding box into two additional bounding boxes if the bounding box contains more than the predetermined maximum number of vertices, the bounding box being divided along an axis that is parallel to: i.) a transverse axis of the bounding box if the length of the bounding box is larger than the width of the bounding box, or ii.) a longitudinal axis of the bounding box if the width of the bounding box is larger than the length of the bounding box; and
repeat the steps of determining and dividing the bounding box for the additional bounding boxes until each additional bounding box does not contain more than the predetermined maximum number of vertices;
identify a location of a vehicle based on telematics data received from a telematics device installed in the vehicle; and
determine whether the vehicle is located within one of the bounding boxes in the plurality of bounding boxes.

* * * * *